Oct. 27, 1942.   W. C. EBERLIN   2,300,211
FILM PRODUCING PROCESS AND APPARATUS
Filed July 8, 1938   4 Sheets-Sheet 1

Walter C. Eberlin   INVENTOR.
BY
ATTORNEY

Oct. 27, 1942.  W. C. EBERLIN  2,300,211
FILM PRODUCING PROCESS AND APPARATUS
Filed July 8, 1938  4 Sheets-Sheet 3
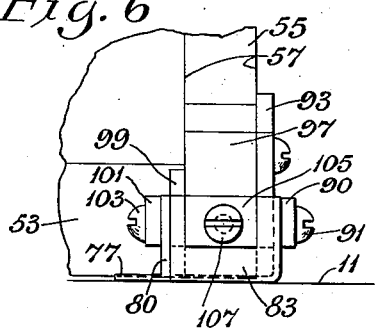
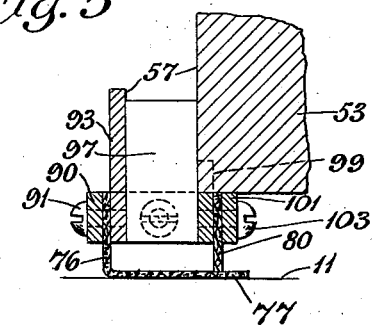
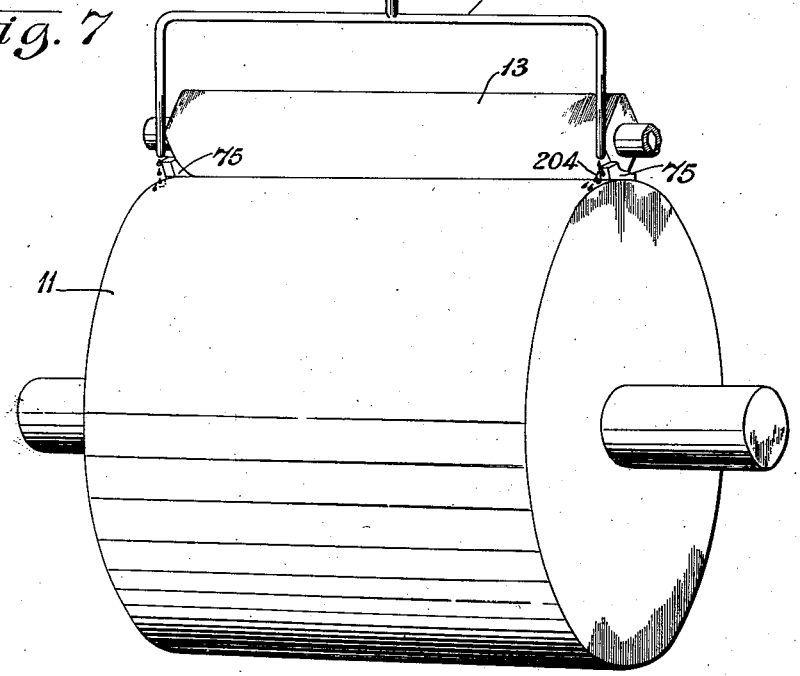
Walter C. Eberlin  INVENTOR.
BY
ATTORNEY Oct. 27, 1942.    W. C. EBERLIN    2,300,211
FILM PRODUCING PROCESS AND APPARATUS
Filed July 8, 1938    4 Sheets-Sheet 4
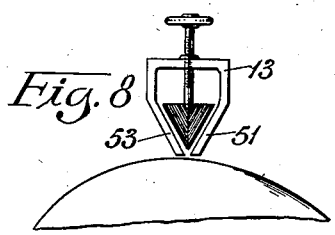
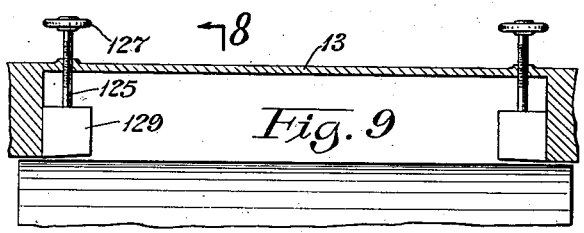
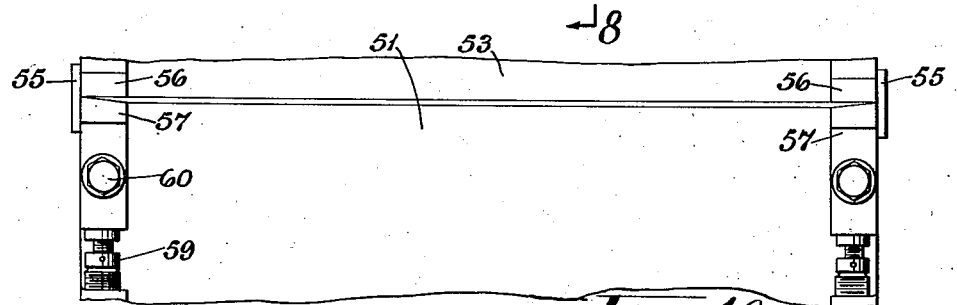
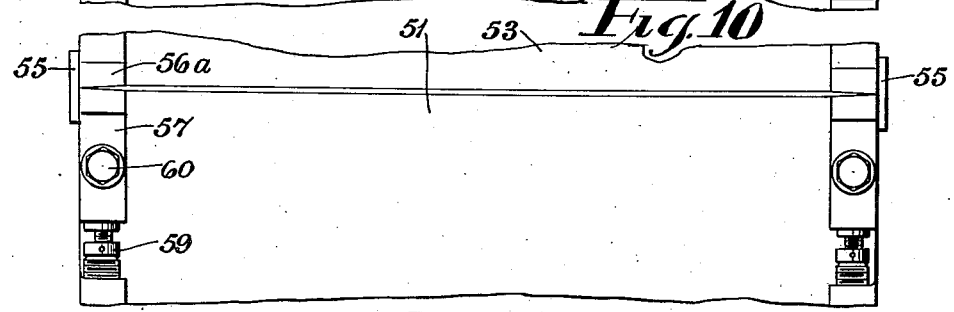
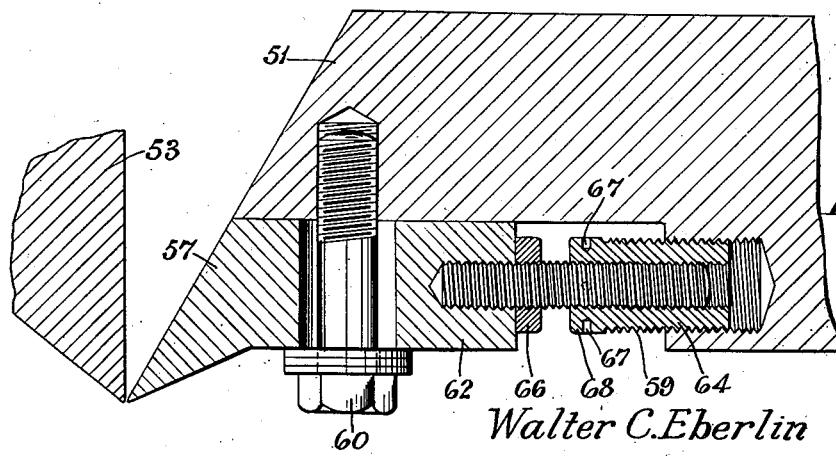
Walter C. Eberlin    INVENTOR.
BY Louis A. Wiebe
ATTORNEY.

Patented Oct. 27, 1942

2,300,211

UNITED STATES PATENT OFFICE 2,300,211

FILM PRODUCING PROCESS AND APPARATUS

Walter C. Eberlin, Kenmore, N. Y., assignor to E. I. du Pont de Nemours & Company, Wilmington, Del., a corporation of Delaware Application July 8, 1938, Serial No. 218,125

4 Claims. (Cl. 18—15)

The present invention relates to sheet or film-forming apparatus, and more particularly it relates to an improved process and apparatus for the dry casting of sheets and films from film-forming solutions, such as organic derivative solutions of cellulose, resins, synthetic rubber, rubber derivatives and linear condensation polymers.

The dry casting of sheets, bands, ribbons, films and the like is conventionally carried out by extrusion of a liquid, film-forming substance through an adjustable slot orifice formed by two longitudinally parallel hopper lips. The liquid film is deposited upon a moving, heated or cooled support on which it is carried through a gaseous drying medium, such as heated air or other inert gas, until the volatile solvent has substantially evaporated and until the resulting film is sufficiently set and firm to permit the ready stripping thereof from the support without tearing. The sheet or film, after being stripped from the support, may be further treated such as by conditioning or humidifying in any desired manner to remove the remaining solvent therefrom, and is finally wound up to form a mill roll.

Heretofore, in the dry casting of sheets and films in the conventional manner, the side edges of the film inherently are formed in a thickness of from two or eight times, or even more, that of the middle portions of the film or sheet. This thickened edge is commonly referred to as a "bead edge" and will hereinafter be so designated. Many efforts have been made heretofore to avoid the formation of bead edges on dry cast sheets and films. However, such previous attempts have been substantially ineffective. Such ineffectiveness has been particularly pronounced when casting at higher casting speeds. The bead edges are apparently formed by reason of surface tension effects. The fluidity of the film-forming solution and the forward pulling action of the moving casting support apparently cause the edges of the web of film-forming solution before striking the casting support to have a tendency to "neck-in." This necking-in gives rise to a bead, or thickened edge, which cannot be entirely avoided, in a practicable manner, by the expedient of positioning the hopper lips very near the surface of the casting support.

Obviously, the formation of a bead edge on a cast film or sheet is very undesirable due to the fact that the bead edges must be cut from the substantially continuous film before winding the same, but such bead edge has furthermore been found particularly undesirable in view of the fact that it definitely limits the speed at which the film or sheet may be cast on a given apparatus. The bead edge being thicker loses its solvent more slowly and, therefore, sets up more slowly and requires, in consequence, a distinctly longer drying time than the middle portions of the film or sheet. Since for a continuous operation, the entire sheet must strip as a unit, the time required by the bead edge to reach a strippable state determines the rapidity with which the film may be stripped from the casting support.

Another objectionable difficulty occurring during the dry casting of sheets and films is the formation of a serrated or saw-toothed edge on the said sheets, sometimes referred to as "feathering." Such feathered edges must be trimmed from the sheet before winding the same and, additionally, they are objectionable in that they tend to cause frequent film tears or complete breaks during stripping of the sheet from the casting support or during the passage of the film through the apparatus after being stripped from the support.

It is therefore an object of the present invention to provide an improved method and apparatus for the dry casting of sheets and films from film-forming solutions with the avoidance of the formation of bead edges and feathered or saw-toothed edges on the sheets.

It is another object of this invention to provide an improved method and apparatus for the dry casting of sheets and films from film-forming solutions by which method it is possible to greatly increase the speeds of dry casting on an apparatus of a given size.

It is a further object of the present invention to provide an improved process and apparatus for the dry casting of sheets and films from film-forming solutions with the avoidance of wastage arising through trimming of the edges from the said sheets or films.

It is a still further object of the present invention to provide an improved method and apparatus for the dry casting of sheets and films from film-forming solutions by which it is possible to control the thickness and shape of the edges of the said sheets and films.

Other objects of the invention will appear hereinafter.

The objects of the invention and the manner in which the same may be accomplished will be more clearly apparent by reference to the following detailed description when taken in connection with the accompanying illustrations, in which:

Figure 5 is a sectional view taken along the lines 5—5 of Figure 4, but with the hopper end plate removed.

Figure 6 is an end elevational view taken from the left end of Figure 4.

Figure 7 is an isometric view showing the arrangement of casting drum, hopper, hopper lip shoes and solvent feed device for supplying solvent to the hopper lip shoes.

Figure 8 is a side elevational view showing a casting drum and a diagrammatic reproduction of two hopper lips and the means of positioning between the interior surface of the hopper lips a hopper lip wedge.

Figure 9 is a side elevational view with parts in section showing the structure of Figure 8.

Figure 10 is a bottom plan view of the hopper lips and the method of attachment of hopper lip end gates.

Figure 11 illustrates a modified form of the device shown in Figure 10.

Figure 12 is a detailed sectional view on an enlarged scale of a hopper lip end gate and means for attaching the same to one of the hopper lips.

It has now been discovered that sheets and films can be dry cast with side edges having substantially the same thickness as the body of the sheet with the absence of feathering or sawtoothing. Such sheets and films can be dry cast by the processes and combinations of apparatus hereinafter to be specifically set forth. Such sheets and films can be cast, for example, by introducing solvent vapor and maintaining a high content of solvent vapor at the extreme side ends of the casting zone. The solvent vapor introduced must be over and above that present from the evaporation of solvent from the freshly cast sheet or film. The solvent vapor may be introduced by applying to the moving casting support, adjacent the hopper lip shoes a volatile solvent such as acetone, methyl ethyl ketone, acetone ethanol, ethyl acetate or a like solvent. It is preferred, to obtain the best possible results at high speeds, to also restrict the flow of the film-forming solution adjacent the extreme ends of the extrusion orifice. These process steps can, for example, be carried out by the use of a hopper lip shoe and a hopper lip draft-proof enclosure in combination with any conventional dry casting apparatus as set forth in detail below.

Figure 2:
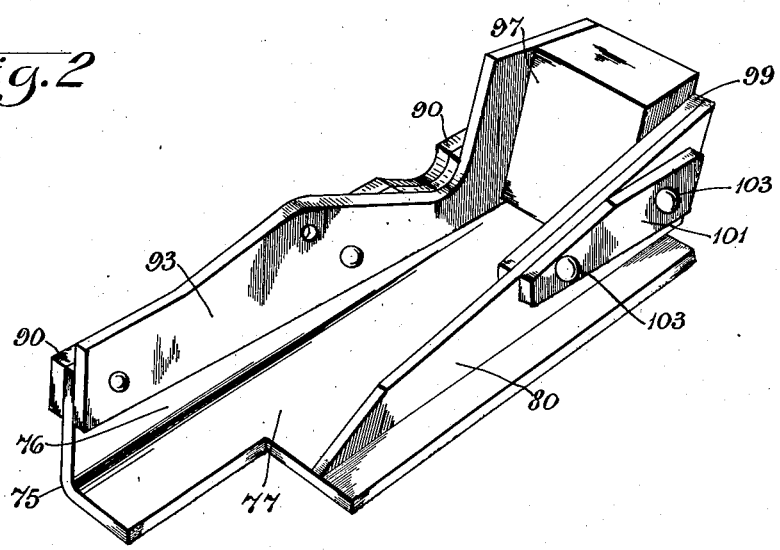
Figure 2 is an isometric view showing a hopper lip shoe constructed in accordance with the present invention.
Figure 1:
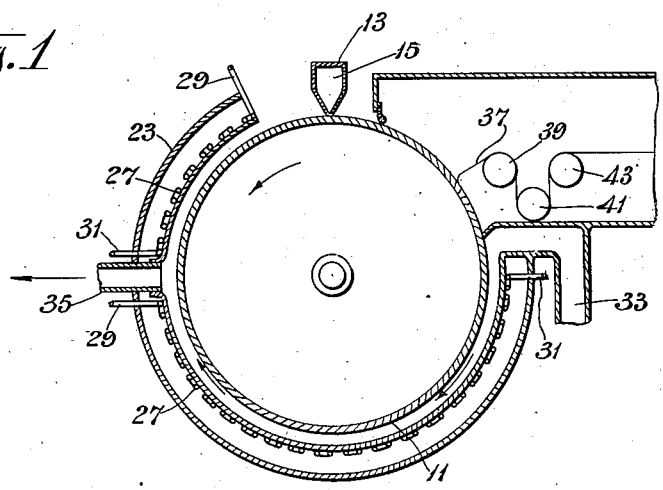
Figure 1 is a diagrammatic side elevational view of a conventional dry casting apparatus for the production of sheets and films.
Figure 3:
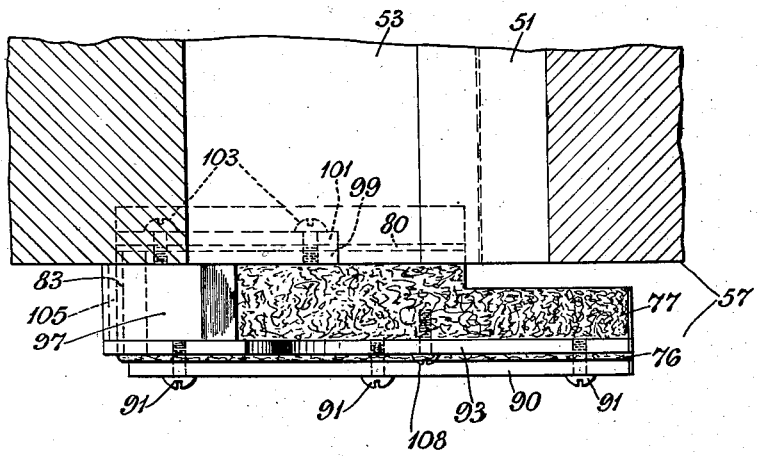
Figure 3 is a top plan view of one end of the hopper lips showing the attached hopper lip shoe. In this view the main body of the hopper and the hopper end plates have been omitted in the interest of clarity.
Figure 4:
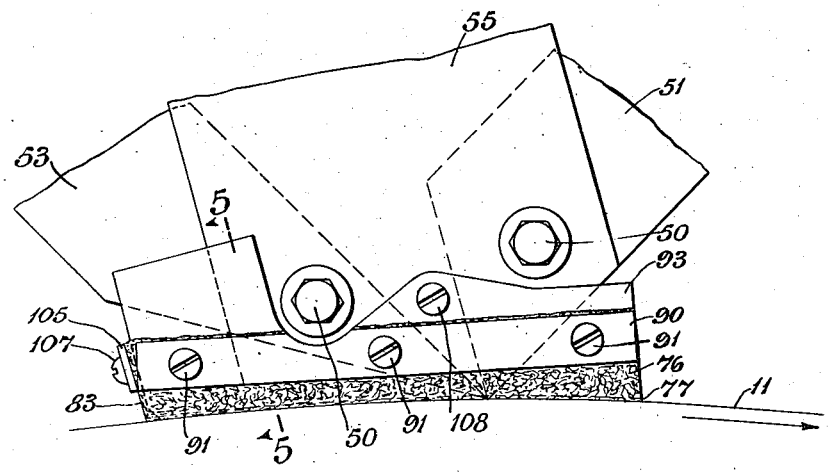
Figure 4 is a side elevational view of the apparatus shown in Figure 3, with the hopper end plate shown in position.

Referring to Figure 1 of the drawings, reference numeral 11 designates a dry casting drum which is positioned below a hopper 13 containing a film-forming solution 15. The casting drum is preferably enclosed by means of an enclosure 23 whereby to recover the solvent evaporating from the extruded sheet or film. The space surrounding the casting drum within the enclosure 23 is, if desired, provided with heating means such as heating coils 27 which coils are provided with inlet means 29 and outlet means 31 for the heating medium.

The space surrounding the casting drum is also provided with inlet means 33 and outlet means 35 whereby a gas such as air may be passed over the extruded sheet or film whereby to cause an evaporation of the volatile solvent and removal of the same to a conventional solvent recovery apparatus. The film 37 formed on the casting drum 11 is preferably stripped from the casting drum by passing the same over stripping roll 39, and it is from this roll passed around rolls 41 and 43 to conditioning or humidifying chambers in a known manner.

Referring to Figures 2 to 7 of the drawings, the hopper 13 is provided with hopper lips 51 and 53 which are spaced a slight distance apart in order to provide a long slit-like orifice through which the film-forming solution is passed. The rear hopper lip is designated by numeral 53, and the front hopper lip by numeral 51. The film-forming solution as it passes from the orifice is collected on the rotating casting drum 11 or on any other casting surface such as a steel belt or the like. The side ends of the hopper 13 are provided with end plates 55 so as to form a complete enclosure of the hopper. These end plates 55 are fastened to the hopper body by means not shown in the figure and to the ends of the hopper lips by screws 50. For clarity the end plate has been omitted in Figures 2, 3, and 5, but its thickness has been indicated by the dimension designated by numeral 57. It should be understood that the lower part of the end plate 55 as shown by dotted lines in Figure 4 has the same contour as the cross-section of the outer hopper lip surfaces.

A hopper lip shoe 75 may be formed of any material with which it is posible to form a draft-proof enclosure. Preferably, it is formed of an absorptive material such as fabric, felt, absorbent paper, soft leather, or the like, and a hopper lip shoe is positioned adjacent to and surrounding a portion of each of the ends of the hopper lips. This hopper lip shoe is preferably positioned to slide over the surface of the casting drum somewhat in the manner shown in Figure 7 of the drawings. The hopper lip shoe is preferably constructed in accordance with Figures 2 to 6 of the accompanying illustrations, and in which reference numeral 77 designates the horizontal portion of the absorptive material and numeral 76 designates the vertical portion which is clamped between metal plates 93 and 90 by means of screws 91 thus holding the shoe 75 firmly in place. Metal plate 93 is fastened to metal block 97 in any desired manner such as by welding or soldering. A section 80 of absorptive material is provided in the rear of and under hopper lip 53. This section 80 is fastened in place by means of a bracket 99 which may be connected to block 97, for example, by welding. The absorptive section 80 is held against bracket 99 by means of metal strip 101, which strip may be connected to bracket 99 by means of screws 103 or in any other desired manner. Another vertically positioned section of absorbent material 83 is preferably placed at the rear end of the bottom section 77. This section may be held in place by means of metal strip 105 which in turn is firmly connected to element 97 by means of screw 107. A hopper lip shoe 75 is positioned adjacent each end of the hopper lips and will substantially enclose and protect from draughts or air currents the side and rear portions of the hopper lips. The hopper lip shoe assembly is held in place in its proper position relative to the hopper lips by fastening block 97 to the end of hopper lip 53 in any desired manner, such as by welding or soldering, and by screw 108 which holds plate 93 against the hopper end plate 55.

If desired, the absorbent sections of the hopper lip shoe may be impregnated with a volatile solvent 204, for example, by positioning above the casting drum 11 and hopper 13 a small reservoir 200 containing a volatile solvent. A conduit connection 202 may be used to pass the volatile solvent from the reservoir 200 to flow onto the side edges of the casting drum 11 as shown in Figure 7 of the drawings.

Referring to Figures 8 and 9 of the drawings, it will be seen that the hopper 13 is provided with an internal wedge-shaped member at each of the extreme sides edges thereof. These wedges 129 are preferably provided with a threaded shaft 125 and a hand wheel 127 whereby the said wedges may be raised and lowered on the internal section of the hopper.

The wedge 129 is V-shaped so as to fit substantially between the hopper lips 51 and 53 and thereby function to somewhat obstruct the passage of the film-forming solution at the extreme outer edges of the orifice between the hopper lips. This hopper lip wedge 129 will function to reduce the flow of film-forming solution at the extreme edges of the hopper lip orifice and thereby compensate for the tendency of the film-forming solution to neck-in to cause the formation of a bead at the ends of the orifice.

Figures 10, 11 and 12 of the drawings illustrate a modified form of hopper lip end closure. In this modification the width of the orifice is substantially reduced at the extreme outer edges by means of an adjustable gate member 57. In Figure 10 the hopper lips 51 and 53 are provided with end plates 55 and with two stationary gate elements 56 which are connected to hopper lip 53. The adjustable gate members 57 contain a beveled edge facing the stationary gate elements 56. The members 57 may be moved towards and away from the elements 56 by means of a differential adjusting screw 59. In the modification shown in Figure 11, the stationary end gate element 56—A is provided with a beveled edge so as to produce a more evenly divided V-shaped section at the extreme edges of the orifice between hopper lips 51 and 53.

Figure 12 illustrates in detail the differential adjustment of adjustable end gate 57. The member 57 may be securely held in position by means of clamping screw 60. The member 57 is provided with a screw threaded element 62 which may be locked in place by means of nut 66. The hopper lip 51 is provided with a screw threaded element 64. The element 64 is internally threaded to fit one end of element 62. The element 64 may be rotated by means of a wrench fitting the depressions 67 in the head 68. Obviously, in order to obtain a micromatic differential adjustment, the threads on element 62 and the external threads on element 64 must have a different size or pitch.

In the preferred modification of the apparatus constructed in accordance with the present invention, the hopper lips are positioned within a distance of 0.004" to 0.125", and in no case more than 0.250" from a moving casting support, such as the casting drum.

The internal wedge hopper lip closure is preferably tapered in shape as illustrated in Figures 8 and 9 of the drawings. It is preferred that the width at the bottom of these wedge-shaped members as viewed in Figure 9 of the drawings does not exceed 0.0625" to 0.5". The innermost side of the wedge is preferably either streamlined or of such a shape that the flow of film-forming solution within the regions at the end of the hopper lips is progressively diminished to nearly zero at the extreme ends. In this manner it is possible to cast a thin sheeting, for example, a sheeting having a thickness of 0.00088", in which the edges of the sheeting measure 0.00088", or if desired, slightly more or less in thickness, for example, 30% to 150% more, while stripping may be readily accomplished at casting speeds considerably exceeding 150" per minute. By use of the method and apparatus of the present invention, sheets and films may be cast at speeds approaching closely the maximum speed at which the main portion of the film may be dried and stripped from the casting support. It is important that the edge flow controlling means be restrained to an effective region of not more than 0.25" to 0.500", since otherwise adjustment in controlling the edge of the film sheet would adversely affect the gauge of the adjacent body portion of the sheet. This is true whether the hopper lip end closure be a wedge-shaped member or a gate member such as illustrated in Figures 10, 11 and 12 of the drawings.

In the practice of the present invention, the extrusion hopper may be either of the pressure or gravity type and the moving casting support may be either an endless band, a wheel or a casting drum. The film cast may be of considerable width, such as sheeting, or relatively narrow, such as bands or ribbons. The film may be either a thin wrapping tissue having a thickness of 0.0005" to 0.003", or a photographic or X-ray film having a thickness of 0.003" to 0.025". The thin sheeting, of course, presents more of an edge beading problem than the thick sheet.

The invention is applicable to almost any concentration and viscosity of film-forming solution; but is most beneficial if the concentration is high and the viscosity relatively high. The invention may, of course, be applied to extrusion dry casting of any film-former in which control of the thickness and shape of the film sheet edge is important. Thus, the film-formers may be cellulose esters readily regenerated to cellulose such as cellulose xanthate, or lowly esterified or lowly etherified cellulose derivatives, organic cellulose derivatives like cellulose acetate, cellulose acetate propionate, cellulose acetate stearate, ethyl cellulose, propyl cellulose, and benzyl cellulose; vinyl resins such as polyvinyl alcohol, and acetals and/or esters of polyvinyl alcohol, and vinyl chloride-vinyl acetate interpolymers; rubber hydrochloride; and synthetic linear condensation polymers such as disclosed in Carothers U. S. Patents Nos. 2,071,250, 2,071,252 and 2,071,253.

The small internal wedge, auxiliary hopper lips, or like means, are preferably designed to be regulated independently, but, if desired, they may be jointly regulated. The auxiliary flow controlling means may, of course, be constructed of any suitable material, such as a light, non-corrosive metal.

The excellence of the process of the invention is obvious both from its practicality and ease of operation. No involved and expensive equipment is required and yet the invention permits dry casting upon and stripping film from a given size of moving casting support at rates exceeding those heretofore obtainable. Additionally, any film waste due to trimming the film sheet edges may be substantially eliminated, provided sufficient care is taken in giving the edges a slightly rounded contour approaching a squared edge.

Since it is obvious that many changes and modifications can be made in the above processes and apparatuses without departing from the nature and spirit of the present invention, it is to be understood that the invention is not to be limited except as set forth in the appended claims.

I claim:

1. The process of dry casting sheets and films from film-forming solutions, which comprises the step of applying a volatile solvent material onto the casting surface solely at the sections surrounding the extreme ends of the casting zone.

2. In a process for the dry casting of sheets and films from film-forming solutions, the step which comprises restricting the flow of film-forming solution adjacent the ends of the extrusion orifice to a greater extent than at other sections of said orifice by partially obstructing the flow of film-forming solution from the extrusion orifice adjacent the ends thereof and applying a volatile solvent material onto the casting surface solely at the sections surrounding the extreme ends of the casting zone.

3. In an apparatus for dry casting sheets and films from film-forming solutions a pair of hopper lips having a slit-like orifice therebetween, means for passing a film-forming solution through said orifice, a casting surface adjacent the orifice, and a hopper lip shoe positioned against the ends and a portion of the rear surface of the said hopper lips whereby to form an end closure at the end and rear portions of the said hopper lips, said hopper lip shoe comprising an absorbent material.

4. In an apparatus for dry casting sheets and films from film-forming solutions a pair of hopper lips having a slit-like orifice therebetween, means for passing a film-forming solution through said orifice, a casting surface adjacent the orifice, and a hopper lip shoe positioned against the ends and a portion of the rear surface of the said hopper lips whereby to form an end closure at the end and rear portions of the said hopper lips, said hopper lip shoe comprising an absorbent material, and means for impregnating said absorbent material with a volatile solvent.

WALTER C. EBERLIN.